(12) United States Patent
Swift (10) Patent No.: US 8,943,337 B1
(45) Date of Patent: *Jan. 27, 2015

(54) POWER MANAGEMENT WITHIN A DATA PROTECTION SYSTEM

(75) Inventor: Jeremy Dean Swift, Plymouth, MN (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,479

(22) Filed: Feb. 27, 2012

Related U.S. Application Data

(63) Continuation of application No. 12/388,693, filed on Feb. 19, 2009, now Pat. No. 8,127,166.

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340; 707/999.2; 711/100

(58) Field of Classification Search
USPC ................. 713/300, 310, 320–324, 330, 340; 707/999.2; 711/100
See application file for complete search history.

(56) References Cited

U.S. PATENT DOCUMENTS

| | | | |
|---|---|---|---|
| 7,472,300 B1 * | 12/2008 | Haustein et al. | 713/323 |
| 7,584,266 B2 * | 9/2009 | Mastrianni et al. | 709/218 |
| 8,127,166 B1 * | 2/2012 | Swift | 713/324 |
| 8,209,287 B2 * | 6/2012 | Thapa | 707/636 |
| 2006/0259795 A1 * | 11/2006 | Tsai et al. | 713/300 |
| 2008/0266698 A1 * | 10/2008 | Shibayama et al. | 360/69 |
| 2009/0254645 A1 * | 10/2009 | Haustein et al. | 709/223 |
| 2010/0121820 A1 * | 5/2010 | Thapa | 707/641 |

* cited by examiner

*Primary Examiner* — M Elamin
(74) *Attorney, Agent, or Firm* — Campbell Stephenson LLP (57) ABSTRACT

Various techniques for managing power consumption of computing devices within a data protection system are disclosed. For example, one method involves accessing policy information, which the policy information indicates when one or more data protection system activities should be performed and identifies whether a computing device is participating in the data protection system activities. Based upon this policy information, the method then identifies whether power consumption of the computing device can be reduced. In response to identifying that the power consumption of the computing device can be reduced, a power management command is automatically sent via a network. Performance of the power management command reduces the power consumption of the computing device.

20 Claims, 3 Drawing Sheets

FIG. 3 ered in this disclosure. Data protection operations include backups, restores, snapshots, replication, and the like.

POWER MANAGEMENT WITHIN A DATA PROTECTION SYSTEM

CROSS-REFERENCE TO RELATED APPLICATIONS

The present patent application is a continuation of U.S. patent application Ser. No. 12/388,693, now U.S. Pat. No. 8,127,166, filed on Feb. 9, 2009, now entitled "Power Management Within a Data Protection System" and is incorporated by reference herein in its entirety and for all purposes.

FIELD OF THE INVENTION

This invention relates to data protection systems and, more particularly, to managing power consumption of data protection systems.

DESCRIPTION OF THE RELATED ART

Data protection systems are designed to protect a customer's data. For example, a backup system is designed to create redundant backup copies of a customer's data at regular intervals. If the customer loses data (e.g., due to a hard drive failure), a copy of that data can be restored from one of the backup copies created by the backup system. The computing devices within data protection systems are often configured to operate constantly, so that these devices will be ready to handle data protection operations such as backups and restores.

As the amount of data that needs to be protected increases, data protection systems incorporate increasingly powerful and/or larger computing devices in order to handle the additional workload presented by the growing amount of data. However, computing devices having increased computing power and bandwidth often also suffer from increased power consumption and/or cooling needs.

Furthermore, in order to ensure that the data protection systems are available to customers whenever needed, data protection systems are often designed to include many redundant components to protect against failures. For example, a backup system can include a cluster of media servers. The cluster behaves as a single media server; however, the cluster includes multiple individual servers. If one media server within the cluster fails, another media server can take over any duties that were being performed by the failed media server.

Accordingly, improvements to data protection systems often also increase power consumption and/or cooling needs of the data protection systems. Accordingly, it is desirable to be able to control the power consumption of data protection systems.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A data protection server operating in a data protection system can control the power consumption state of one or more other computing devices, such as other data protection servers, within the data protection system. The data protection server controls power consumption states of other computing devices based upon the status of data protection operations within the data protection system. The data protection server can also control the power consumption state based upon power management information, which specifies which computing devices can be power managed and/or particular management criteria for use in power managing the computing devices, that has been provided by an administrator.

Figure 1:
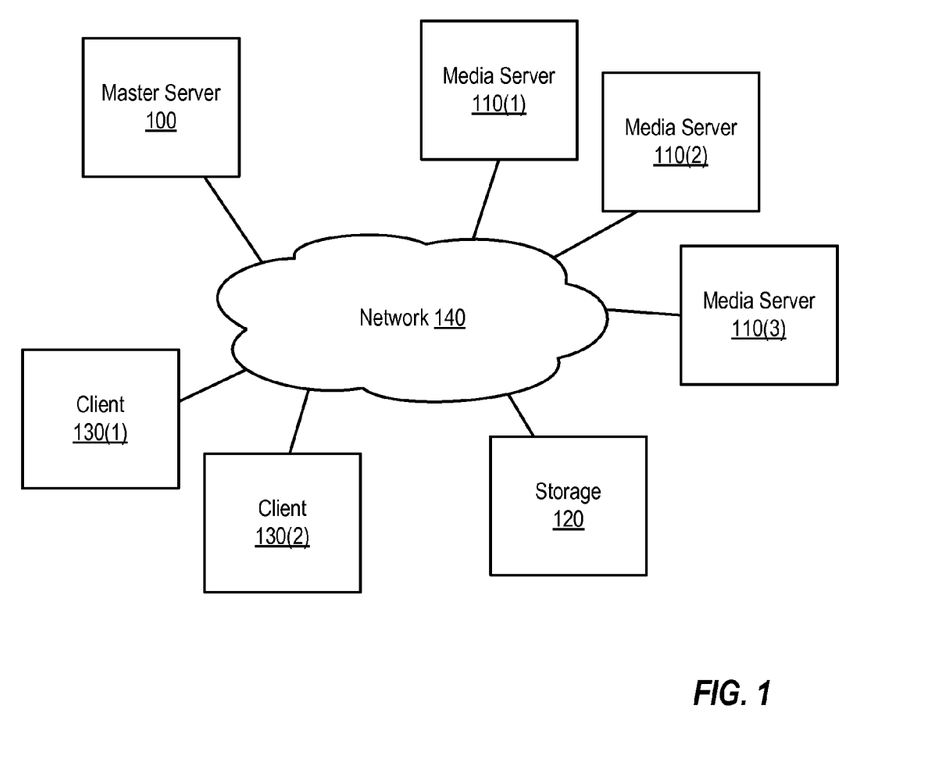
FIG. 1 is a block diagram of a system in which a data protection server can control the power consumption state of other computing devices within the data protection system, based upon the status of data protection operations in the system, according to one embodiment of the present invention.

FIG. 1 is a block diagram of a system in which a data protection server can control the power consumption state of other computing devices within the data protection system, based upon the status of data protection operations in the system. As shown, the data protection system includes a master server 100, three media servers 110(1), 110(2), and 110(3), storage 120, and two clients 130(1) and 130(2), all of which are coupled by a network 140.

While particular numbers and types of devices are shown in the example of FIG. 1, it is noted that other embodiments can include different numbers and types of devices (e.g., some embodiments may include significantly more clients and servers than are illustrated in the simplified example of FIG. 1). Furthermore, other embodiments can employ such devices in different configurations than are shown in FIG. 1.

Network 140 can include one or more storage, local, and/or wide area networks. Network 140 can be implemented using various topologies, communication protocols, and physical links (e.g., wireless links, coaxial cables, and the like). In some embodiments, certain components (e.g., a media server and storage) may be directly connected, as opposed to being connected via a network.

Storage 120 can include one or more storage devices, including magnetic storage devices (e.g., hard drives, tape drives, and the like), solid state storage devices (e.g., flash drives and the like), optical storage devices (e.g., compact disc and/or digital video disc drives), and the like. Storage 120 can also include one or more arrays (e.g., redundant array of independent disk (RAID) arrays, just a bunch of disk (JBOD) arrays, and the like) and/or libraries (e.g., tape libraries, virtual tape libraries, optical disc jukeboxes, and the like) of such storage devices.

Master server 100 and media servers 110(1)-110(3) are each configured to act as servers in a data protection system. As servers in a data protection system, these servers participate in data protection operations, such as backup and restore operations, that protect data used by clients (e.g., clients 130(1)-130(2)) against loss due to component failures, accidental deletion, and the like. In one embodiment, these servers are NetBackup™ servers that execute NetBackup™ software provided by Symantec Corporation of Cupertino, Calif.

In this example, master server 100 is the controller of the data protection system. Master server 100 performs functions such as data protection operation scheduling, maintenance of data protection policies, resource allocation (e.g., by allocating storage to media servers), status and error logging and reporting, backup catalog generation and maintenance, and the like. The data protection policies specify the "who, what, where, when and how" of each data protection operation. For example, the policies can specify the schedule controlling when and/or how often backups are performed for a particular client, as well as which items of data (e.g., which files) do and do not need to be backed up from that client, how long backups need to be retained, how long it should take to restore data from a backup to the client, and which portions (e.g., in terms of storage groups) of storage 120 can store data copied from a particular client. The policies can also specify which data protection servers are involved in each scheduled data protection operation. The policies can also indicate (e.g., by associating certain data protection servers with certain data) which data protection servers are involved in unscheduled data protection operations. For example, if a restore request is received for a particular item in a backup catalog, the policies may indicate which media server should be involved in responding to that restore request, based upon which item of data is requested.

Master server 100 can cause data protection operations to be performed in a manner that satisfies the policies. Accordingly, master server 100 can automatically schedule backup operations that comply with the policies, without the need for further user input. However, master server 100 can also cause data protection operations to be performed in response to user input (e.g., such as user input requesting to restore data from a backup).

Data protection operations are operations that access (e.g., read or write) a backup image (e.g., a copy of the backed-up information) on storage 120. A data protection operation can copy a backup image to storage 120 directly from an original source of the backup image (e.g., from the client computer on which the information being backed up was generated) or indirectly from a database of backup images (e.g., such a database can be generated by a backup server that produces the backup images). Similarly, a data protection operation can read all or part of a backup image from storage 120 in order to perform a restore (e.g., to the original source of the backed-up information or to an alternative destination) or duplication operation (e.g., in order to create a second copy on another storage device for disaster recovery purposes or for purposes of complying with a service level agreement (SLA)).

Media servers 110(1)-110(3) act as data movers within the data protection system. Media servers 110(1)-110(3) act under the direction of master server 100 to perform one or more scheduled data protection operations by transferring copies of data between clients 130(1) and 130(2) and storage 120.

Clients 130(1)-130(2) can include any computing device that sends data to a media server for storage by the data protection system on storage 120. In some situations, a device can be both a media server and a client. For example, if a media server is a storage area network (SAN) media server that acts as the source of data for a backup operation, that media server is also a client of the data protection system.

In some embodiments, the functionality of master server 100 and media servers 110(1)-110(3) may be combined into a single server that both manages data protection operations and performs data protection operations. One or more such combined-functionality servers can be included within the data protection system, instead of and/or in addition to single-function master and/or media servers. One such combined-functionality server can manage the power consumption states of other such servers, using the techniques described herein.

Figure 2:
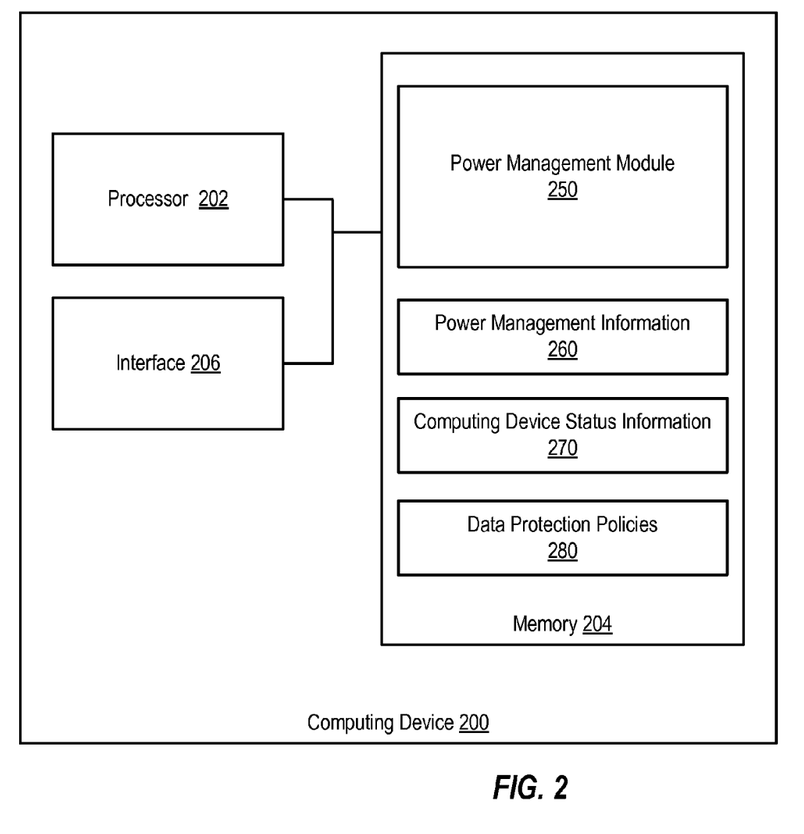
FIG. 2 is a block diagram of a computing device configured to control the power consumption state of other computing devices within the data protection system, based upon the status of data protection operations in the system, according to one embodiment of the present invention.

Master server 100 and media servers 110(1)-110(3) are computing devices, such as the one shown in FIG. 2. Such computing devices can include server computer systems, personal computer systems, personal digital assistants, mobile or cell phones, laptop computers, network appliances, storage system controllers, and the like. Each type of server can be implemented by executing function-specific software (e.g., providing the functionality of a master and/or media server) on such a computing device, by including function-specific hardware (e.g., application-specific integrated circuits) in such a computing device, and/or by including a combination of function-specific hardware and function-specific software in such a computing device.

In some embodiments, certain master and/or media servers can be clustered. A cluster is typically configured so that the cluster appears to be a single device when interacting with other components (e.g., media servers and clients) of the data protection system. Accordingly, a cluster of servers can provide greater bandwidth and/or reliability than a single server, while still behaving as a single server within the data protection system.

As an example of a clustered group of servers, master server 100 can be implemented on a two-node failover cluster in order to provide increased availability. In such a cluster, two computing devices are each configured as a master server. One computing device within the two-node cluster acts as the active master server and performs the master server functionality for the data protection server, while the other computing device acts as a failover server. While the active master server is operational, the failover server will not participate in the activity of the data protection system (this is referred to herein as a failover state). If the active master server fails, however, the failover server will become the active master server, taking over the operations that were previously being handled by the now failed master server. In alternative cluster configurations, more than one server can be active at the same time (e.g., in order to provide increased bandwidth).

Additional computing devices can also be included within a data protection system and power managed by a data protection server. For example, storage servers can be included within the data protection system. Storage servers are computing devices that serve storage (e.g., such as storage 120) for use by the data protection system by acting as access points for the storage. Storage servers can include network devices (e.g., SAN switches) that control or otherwise provide access to an array of storage devices.

At least some of the computing devices in the data protection system are capable of being placed in more than one power consumption state. The simplest pair of power consumption states supported by a computing device is simply on (consuming power) and off (not consuming power, or consuming minimal power). Many computing devices support additional states in which those computing devices continue to at least partially operate. For example, one computing device can support a sleep state and a hibernation state in addition to the normal on and off states. The sleep state is a state in which the computing device's processor cache(s) are flushed to main memory (e.g., random access memory (RAM)) and the computing device's processor(s) have either stopped executing instructions or are powered off, but power to the computing device's main memory is maintained. The hibernation state is a state in which the computing device's processor(s) and main memory are powered off, after the processor cache(s) have been flushed to main memory and the contents of main memory have been saved to non-volatile storage, such as a hard drive Computing devices can support a soft off state, in which most components of the computing device are powered off, except for those components (e.g., keyboards or other user input devices, system clock, modems, local area network interfaces, universal serial bus (USB) devices, and/or the like) that allow the computing device to receive commands to return to a higher power consumption state. Some computing devices can support states in which components of those computing devices can be selectively turned on and off to reduce power consumption. For example, some computing devices can allow various components, such as internal hard drives, video cards, processors, and the like, to be selectively powered down in order to reduce power consumption of the computing devices in which those components are included.

Some computing devices can provide a power management interface via which the power consumption state of that computing device can be remotely managed by another computing device. Such a power management interface allows each such computing device to receive a power management command from another computing device, such as the master server of the data protection system, via a network and to automatically change from one power consumption state to another in response to receiving the command. In some embodiments, the power management interface can comply with the Advanced Configuration and Power Interface (ACPI) standard and/or the Wake on LAN (WOL) standard.

Some computing devices may not themselves provide such an interface; however, another computing device, which controls power consumption of those computing devices, can provide such an interface. For example, a media server may not itself include a power management interface. Instead, a power management device, which does include a power management interface, can be coupled to control the amount of power consumed by the media server (e.g., by being coupled between the media server and a source of power to the media server). Accordingly, the power consumption of the media server can be controlled by the power management device.

In some embodiments, an administrator needs to manually enable power management on each computing device that is to be power managed within the data protection system. If power management is not enabled on some computing devices, these computing devices will not respond to power management commands. In addition to enabling power management, the administrator may configure security features. For example, the administrator may configure each computing device to only accept power management commands from certain other computing devices (e.g., the master server). In some embodiments, this configuration can be specified by entering the network address (or a range of network addresses) from which power management commands can be received and/or by configuring a password or other security code that must be provide with power management commands before those power management commands will be executed. In the latter situations, both the computing devices to be power managed and the computing device(s) to perform the power management (e.g., the master server) can be configured with the appropriate passwords or security codes.

As noted above, the server that acts as the master server maintains the data protection policies and controls the performance of data protection operations, both in response to the policies and in response to user input. Thus, the master server can determine which other computing devices within the data protection system are needed at any particular point in time, based upon the current backup policies and any outstanding data protection requests. Based upon this information, the master server (or another server that has access to the same information) can control the power consumption state of each other computing devices in a manner that does not interfere with the ability of those other computing devices to participate in the data protection system when needed. For example, after a nightly backup operation is performed, the master server can determine, based upon the data protection policies, that one of the media servers will not be needed until the beginning of the next nightly backup operation. Accordingly, the master server can cause that media server to enter a lower power consumption state after the nightly backup operation is performed. The master server can then cause the media server to resume its higher power consumption operating state in time for the media server to be fully operational for the next nightly backup operation. The master server can cause these power state changes to occur automatically, without the need for additional user input. The master server supports one or more power management interfaces (e.g., ACPI, WOL, and the like), such that the master server can send power management commands to other computing devices via a network.

Another device within the data protection system can also act to control the power management of other computing devices, if the other device has access to the same policy information as the master server. For example, a spare master server in a cluster of master servers that share storage can access the data protection policies maintained by the active master server. Based on these policies, the spare master server can manage the power consumption of other computing devices within the data protection system.

In order to further refine the power management techniques implemented by the master server (or other server with access to the same information as the master server), an administrator can provide additional power management information to the master server (e.g., as part of an initial configuration process for the data protection system). This power management information can identify which computing devices can be power managed, as well as the circumstances under which those computing devices can be power managed. Allowing such configuration information to be provided gives users additional assurance that power management will not interfere with business critical operations. In some embodiments, this additional power management information is stored in a file or database that is accessible to the master server (or other server with access to the policy information). When this additional information is present, the master server (or other server controlling power consumption) will base power management decisions (e.g., such as deciding whether to send a command to reduce power consumption to another computing device) on both the policies and the power management information.

The additional power management information can list computing devices within the data protection system and indicate whether those computing devices can be power managed by the data protection system (e.g., in some embodiments, mere inclusion of a computing device within the power management information indicates that the computing device can be power managed). Computing devices can be specified individually (e.g., using network names and/or addresses), by type or role within the data protection system, by type of operating system or other software characteristics of the computing devices, by hardware included within the computing devices, by connectivity (e.g., all computing devices on the same type of network (e.g., Ethernet) and/or on the same network), and/or by ranges of network addresses. Roles within the data protection system can include master server (e.g., any computing device configured as a master server, regardless of whether currently active), media server (e.g., any computing device configured as a media server, regardless of whether currently active), active master server (e.g., any computing device configured as a master server and currently operating in an active state within a cluster of master servers), active media server (e.g., any computing device configured as a media server and currently operating in an active state within a cluster of media servers), spare master server (e.g., any computing device configured as a master server and currently operating in a failover state within a cluster of master servers), spare media server (e.g., any computing device configured as a media server and currently operating in a failover state within a cluster of media servers), and the like.

Additionally, the power management information can specify when a given computing device or group of computing devices can begin and end their participation in power management under the control of the data protection system. This timing information can be provided as a time and day of the week (e.g., 8:00 AM Monday), a calendar date and time (e.g., Feb. 8, 2009, at 7:00 AM), an amount of time that the computing device has not been in use (e.g., a computing device that has not participated in any data protection operation in the past 30 minutes), an amount of time until the computing device is needed to participate in a data protection operation (e.g., a computing device that is not scheduled to participate in any data protection operation for the next three (3) hours), a time in which the computing device is in a particular state, on demand (e.g., indicating that participation can end on demand, in response to the participating computing device being selected to participate in a data protection operation by the master server), and the like. A state of the computing device can include a down state (e.g., in which data protection software has been shut down but the computing device is still powered) and a non-down state (e.g., in which data protection software is executing on the computing device).

As an example, the power management information for a particular computing device or group of computing devices can indicate that the computing device(s) can participate in power management on weekends, as well as if the computing device(s) have not participated in data protection operations in the last hour and are not scheduled to participate in another data protection operation for at least three hours, as well as when the computing device(s) have been downed by an administrator. As another example, the power management information can simply indicate that a computing device can participate in power management beginning on Jan. 1, 2009.

The power management information can also indicate the power consumption states into which a given computing device (or group of such computing devices) can be placed by the data protection system. For example, if a computing device supports several levels of power consumption (e.g., a normal operating state, a sleep state, a hibernate state, and a soft off state, and an off state), the power management information can specify which, if any, of those states the computing device can be placed in by the data protection system. In some embodiments, these states can be tied to timing information, such that certain states can only be entered at certain times.

As an example, the power management information can indicate that the data protection system can command a particular computing device to enter the normal, sleep, and hibernation states, but that the data protection system cannot command that computing device to enter a soft off or off state. The power management information can indicate this in a variety of different ways (e.g., in some embodiments, each state can have an associated value, such as yes or no, while in other embodiments, the mere inclusion of information identifying a particular state within the power management information can indicate that the data protection system can manage that state).

If a computing device supports multiple power consumption states, the power management information can, in some embodiments, specify whether staged reductions in power consumption can be applied to that computing device, as well as the conditions under which such staged reductions can take place. For example, the power management information can indicate that the computing device can be placed in a sleep state after 30 minutes of inactivity within the data protection system, and then placed in a hibernation state after three (3) hours of inactivity.

Certain power management information can also, in some embodiments, be generated by the master server (or other server controlling the power consumption of computing devices within the data protection system). In some embodiments, the master server (or other server) is configured to dynamically discover the power management settings of computing devices within the data protection system. For example, the master server can query each of the computing devices in the system for their current operating system settings, to see if the computing devices have been enabled for remote power management. If so, the master server can store information indicating which computing devices are enabled for remote power management, as well as the power consumption states into which those computing devices can be placed via remote power management.

The power management information can be stored (e.g., in a file or database) for later use by the master server by the administrator or by the master server. For example, in one embodiment, administrators may enter the desired power management information into a tab-separated list stored in a text file. The resulting text file can then be stored on the master server (or in a storage location accessible to the master server). Alternatively, the master server can provide a user interface that prompts the administrator for the power management information, and as the administrator enters information into the user interface, the master server can populate a file or database with the entered information. Various formats and input schemes can be used when generating the power management information.

FIG. 2 is a block diagram of a computing device 200 that is configured to control the power consumption state of other computing devices within the data protection system, based upon the status of data protection operations in the system. In particular, FIG. 2 shows how a power management module 250, which controls the power consumption state of computing devices within the data protection system, can be implemented in software. Power management module 250 can be integrated within or coupled to a master server or other server that has access to policy information maintained by the master server.

Computing device 200 can be a personal computer, network appliance, server, personal digital assistant, mobile phone, storage controller (e.g., an array controller, tape drive controller, or hard drive controller), laptop computer, or the like. In general, computing device 200 is configured to execute software or otherwise provide appropriate functionality to act as a component of the data protection system described herein. In one embodiment, computing device 200 is configured (e.g., by executing data protection system software) as a master server within a data protection system.

As illustrated, computing device 200 includes one or more processors 202 (e.g., microprocessors, programmable logic devices (PLDs), or application specific integrated circuits (ASICs)) configured to execute program instructions stored in memory 204. Memory 204 can include various types of RAM, Read Only Memory (ROM), Flash memory, micro electro-mechanical systems (MEMS) memory, magnetic core memory, and the like. Memory 204 can include both volatile and non-volatile memory. Computing device 200 also includes one or more interfaces 206. Processor 202, interface 206, and memory 204 are coupled to send and receive data and control signals by a bus or other interconnect.

Interface 206 can include a network interface to various networks and/or interfaces to various peripheral buses. For example, interface 206 can include a network interface (e.g., implemented as a network interface card) via which power management commands generated by power management module 250 can be sent to other computing devices. Such a network interface can also allow power management module 250 to communicate with a master server (e.g., in order to obtain policy management information), if the master server is not implemented on computing device 200. Interface 206 can also include an interface to one or more storage devices (e.g., on which data protection policy information is persistently stored).

In this example, program instructions and data executable to implement all or part of power management module 250 are stored in memory 204. Additionally, memory 204 can store power management information 260, computing device status information 270, and/or data protection policies 280. Power management module 250 can use these additional sets of information to control the power consumption of computing devices within a data protection system.

Power management information 260 identifies which devices within the data protection system can be power managed by power management module 250, when those devices can be power managed, and what power consumption states those devices can be placed in by the power management module, as described above. This power management information can be formatted and stored by an administrator and/or by power management module 250 itself (e.g., if power management module 250 provides a user interface that prompts an administrator for such information, and/or if power management module 250 obtains this information by querying computing devices within the data protection system for their remote power management settings).

Computing device status information 270 is an optional set of information that can track relevant information about each computing device to be power managed within the data protection system. Computing device status information 270 can be generated and maintained by power management module 250. Computing device status information 270 can indicate the current power consumption state of each computing device within the data protection system, as well as information identifying the times at which relevant changes in status occurred for each computing device. For example, if power management information 260 indicates that a certain computing device can be placed in a lower power consumption state no sooner than 30 minutes after that computing device finishes participating in a data protection operation, power management module 250 can record the time that the computing device finished participating in its most recent data protection operation in computing device status information 270.

Data protection policies 280 specify the data protection policies in place for the data protection system. Data protection policies 280 includes information that power management module 250 can process to determine when automated data protection operations are scheduled to be performed, as well as which computing devices are needed to perform each scheduled operation. Data protection policies 280 can also indicate which computing devices are needed to perform user-requested data protection actions (e.g., like restore operations). Based upon this information (in conjunction with power management information 260 and/or computing device status information 270, if either of these sets of information is available), power management module 250 can determine whether to send a power management command to increase or decrease the power consumption of a particular computing device within the data protection system.

In some embodiments, data protection policies 280 and power management information 260 provide all the information that is needed to manage the power consumption of the data protection system. Alternatively, any additional needed information can be generated dynamically and/or requested from other devices. In such embodiments, computing device status information 270 may not be included.

In some embodiments, instead of directly accessing certain types of information (e.g., in a file or database that is available locally to the power management module), power management module 250 can request such information from another device or application via an interface (e.g., a command line interface (CLI), application programming interface (API), or the like). For example, if power management module 250 is not integrated with a master server, power management module 250 can be configured to obtain data protection policy information from the master server by accessing such an interface.

The program instructions and data implementing power management module 250 can be stored on various computer readable storage media such as memory 204. In some embodiments, such software is stored on a computer readable storage medium such as a compact disc (CD), digital versatile disc (DVD), hard disk, optical disk, tape device, floppy disk, and the like). In order to be executed by processor 202, the instructions and data can be loaded into memory 204 from the other computer readable storage medium. The instructions and/or data can also be transferred to computing device 200 for storage in memory 204 via a network such as the Internet or upon a carrier medium.

Figure 3:
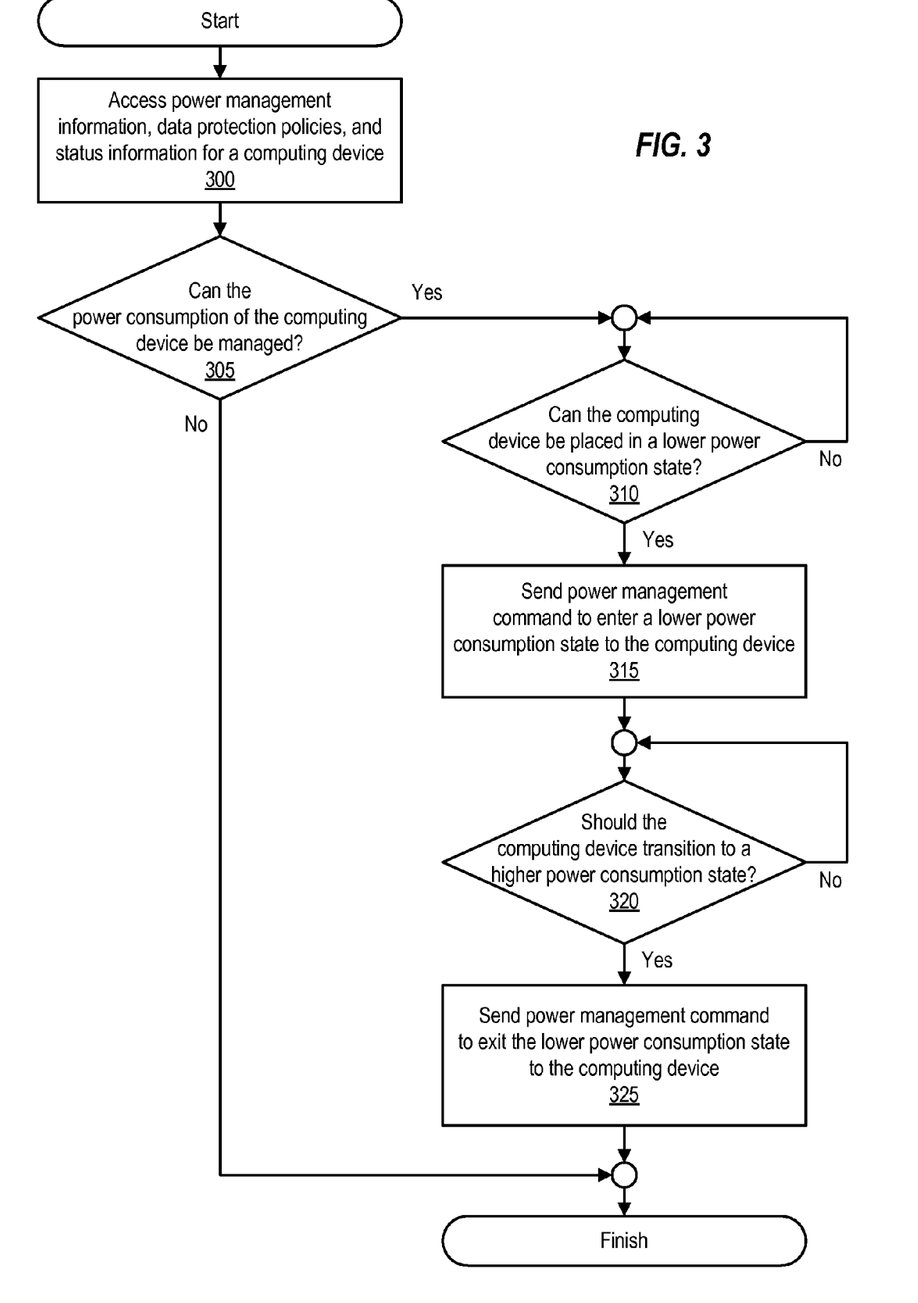
FIG. 3 is a flowchart illustrating a method of controlling the power consumption state of a computing device within a data protection system, according to one embodiment of the present invention.

FIG. 3 is a flowchart illustrating a method of controlling the power consumption state of a computing device within a data protection system. The method of FIG. 3 can be performed by a power management module like power management module 250 of FIG. 2.

The method begins at 300, when power management information, data protection policies, and/or status information for a computing device is accessed. Based upon this information, a determination is made at 305 as to whether the power consumption of the computing device can be remotely managed by the power management module. For example, if the power management information indicates that remote power management of the computing device is not allowed, or if the power management module determines (e.g., by querying the computing device for its operating system settings) that the computing device is not enabled for remote power management, a determination that the computing device cannot be remotely power managed can be made. This determination can be made (in series, in parallel, or in some combination or series and parallel operations) for each computing device within the data protection system. This determination can be repeated at periodic intervals or in response to predetermined stimuli (e.g., each time a computing device joins the data protection system or is restarted, the power management module can redetermine whether that computing device can be power managed).

If the computing device can be power managed, a determination is made as to whether the computing device can be placed in a lower power consumption state, as shown at 310. This determination can involve using the data protection policies (accessed at 300) to see whether the computing device is currently performing any data protection operations or is scheduled to soon perform any data protection operations. If power management information is also present, the power management information can be used to determine whether any additional constraints on when the computing device can be placed in a lower power consumption state are present. The status information (if present) for the computing device can also be used to determine, for example, whether the computing device has met the criteria (e.g., as specified in the power management information) needed to transition to a lower power consumption state and/or to determine whether the computing device is already in a lower power consumption state. Operation 310 can involve comparing the current time to a time period in which power management of the computing device is allowed, comparing the current time to a time period in which the computing device is allowed to be placed in one or more lower power consumption states, selecting a future time in which the computing device is not scheduled to be in use and is allowed to be placed in a lower power management state, and the like.

This determination can also involve selecting one of several lower power consumption states, if available. In some embodiments, the default configuration is to simply select the next lower power consumption state that is available to be selected (e.g., leading to a staged power reduction that cycles through several states, each having lower power consumption than the previously selected state). In other embodiments, the default configuration is to select the lowest available power consumption state, without first selecting any intervening power consumption states.

The determination as to whether the computing device can be placed in a lower power consumption state can be repeated multiple times (e.g., at periodic intervals, or in response to predetermined stimuli). Furthermore, this determination can be performed in parallel for more than one computing device.

If the available sets of information indicate that the computing device can be placed in a lower power consumption state, a power management command requesting that the computing device enter a lower power consumption state is sent to the computing device, as shown at 315. This command can be sent according to a power management interface such as WOL or ACPI.

If more than one lower power consumption state is supported (e.g., if both a sleep state and a hibernation state are supported) and each power consumption state has different criteria (e.g., as specified in the power management information), operations 310 and 315 can be repeated for each additional lower power consumption state into which the computing device can be placed. Thus, after sending a command to enter the sleep state to a computing device, the power management module can repeat operations 310 and 315 in order to command the computing device to later enter the hibernation state.

At 320, a determination is made as to whether the computing device should be transitioned back to a higher power consumption state. Like the other determinations, operation 320 can be performed based upon the computing device status, data protection policies, and power management information. For example, if the data protection policies indicate that the computing device will soon be needed to perform an automated backup operation, operation 320 can determine that the computing device should be transitioned back to a fully powered state.

If the computing device should transition to a higher power consumption state, a power management command instruction the computing device to exit the lower power consumption state is sent to the computing device, as shown at 325. Such a command can either directly specify the desired power consumption state, specify that the lower power consumption state should be exited, or specify that a higher power consumption state should be entered.

In some embodiments, instead of sending power management commands directly to the computing device (as described in operations 315 and 325), the power management commands are sent to a device coupled to the computing device. This intermediate device in turn responds to the commands by changing the power consumption of the computing device, as described above.

It is noted that the operations shown in FIG. 3 can be performed in a different order than is illustrated. For example, while operation 300 is shown being performed prior to other operations, operation 300 may actually be performed at the same time as several of the other operations (e.g., different sets of information can be accessed at different times, depending upon the particular determination to be made). Similarly, additional operations (not illustrated in FIG. 3) can be performed in addition to and/or instead of those illustrated in this example. Furthermore, a power management module may perform certain operations of FIG. 3 in parallel for the same or different computing devices.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
   accessing power management information, wherein
      the power management information comprises
         an identity of a computing device that is participating in one or more data protection activities,
         a type of the computing device, wherein
            the type is one device type selected from among a plurality of device types, and
         an indication, based on the type of the computing device, that indicates whether the computing device can be power managed;
   determining, using one or more processors, whether power consumption of the computing device can be increased, wherein
      the determining is based on the indication; and
   sending, using the one or more processors, a command, in response to a determination that the power consumption of the computing device can be increased, wherein
      the sending of the command is performed prior to performance of one of the one or more data protection activities, and
      performance of the command increases the power consumption of the computing device.

2. The method of claim 1, further comprising
determining whether the power consumption of the computing device can be reduced, wherein
the determining is based on the indication.

3. The method of claim 1, wherein
the power management information further comprises timing information of the one or more data protection activities.

4. The method of claim 1, wherein
the power management information further comprises scheduling information regarding when the one of the one or more data protection activities is scheduled to be performed.

5. The method of claim 1, wherein
the one or more data protection activities comprise one or more of:
  a backup operation,
  a restore operation, or
  a duplication operation.

6. The method of claim 1, wherein
the power management information further comprises a time during which the power consumption of the computing device can be changed.

7. The method of claim 6, wherein
the power management information further comprises one or more power consumption states into which the computing device can be placed, and
the command indicates a first of the one or more power consumption states.

8. The method of claim 1, wherein
the accessing the power management information further comprises accessing policy information, wherein
  the policy information comprises the power management information.

9. The method of claim 1, wherein
the sending the command comprises sending the command to a device coupled to the computing device, wherein
  the device provides power to the computing device.

10. A system comprising:
a processor,
a storage device, wherein
  the storage device stores policy information, and
  the policy information comprises
    an identity of a computing device that is participating in one or more data protection system activities,
    a type of the computing device, wherein
      the type is one device type selected from among a plurality of device types, and
    an indication based on the type of the computing device, that indicates whether the computing device can be power managed; and
a power management module, executable by the processor, configured to access the policy information, wherein
  the power management module is configured to
    determine whether power consumption of the computing device can be increased, wherein
      the determination is based on the indication,
    send a power management command in response to a determination that the power consumption of the computing device can be increased, wherein
      the power management module is configured to send the command prior to performance of one of the one or more data protection activities, and wherein
        performance of the command is configured to increase the power consumption of the computing device.

11. The system of claim 10, wherein
the power management module is further configured to
  make a determination whether the power consumption of the computing device can be reduced, wherein
    the determination is based on the indication.

12. The system of claim 10, wherein
the policy information further comprises power management information.

13. The system of claim 10, wherein
the power management module is further configured to perform the determination based upon the policy information, and
the policy information further comprises timing information of the one or more data protection activities.

14. The system of claim 10, wherein
the policy information further comprises scheduling information regarding when the one of the one or more data protection activities is scheduled to be performed.

15. The system of claim 10, wherein
the policy information further comprises one or more power consumption states into which the computing device can be placed, and
the command indicates a first of the one or more power consumption states.

16. A computer program product comprising:
a plurality of instructions, comprising
  a first set of instructions, executable on a computer system, configured to access power management information, wherein
    the power management information comprises
      an identity of a computing device that is participating in one or more data protection activities,
      a type of the computing device, wherein
        the type is one device type selected from among a plurality of device types, and
      an indication, based on the type of the computing device, that indicates whether the computing device can be power managed,
  a second set of instructions, executable on the computer system, configured to determine whether power consumption of the computing device can be increased, wherein
    the determination is based on the indication, and
  a third set of instructions, executable on the computer system, configured to send a command, in response to a determination that the power consumption of the computing device can be increased, wherein
    the sending of the command is performed prior to performance of one of the one or more data protection activities, and
    performance of the command is configured to increase the power consumption of the computing device; and
a non-transitory computer-readable storage medium, wherein the instructions are encoded in the non-transitory computer-readable storage medium.

17. The computer program product of claim 16, wherein
the plurality of instructions further comprise a fourth set of instructions, executable on the computer system, that are configured to determine whether the power consumption of the computing device can be reduced, wherein
  the determination is based on the indication.

18. The computer program product of claim 16, wherein
the second set of instructions comprises
  a first subset of instructions, executable on the computer system, configured to make the determination based upon the power management information, and the power management information further comprises timing information of the one or more data protection activities.
19. The computer program product of claim 16, wherein the power management information further comprises scheduling information regarding when the one of the one or more data protection activities is scheduled to be performed.
20. The computer program product of claim 16, wherein the power management information further comprises one or more power consumption states into which the computing device can be placed, and
the command indicates a first of the one or more power consumption states.

\* \* \* \* \*